United States Patent

Buck

[11] Patent Number: 6,039,821
[45] Date of Patent: *Mar. 21, 2000

[54] BONDING FIBROUS BATTS WITH THERMOSETTING FIBER-BINDERS OF CERTAIN EPOXY RESINS

[76] Inventor: George S. Buck, 6707 Fletcher Creek Cove, Memphis, Tenn. 38133

[*] Notice: This patent is subject to a terminal disclaimer.

[21] Appl. No.: 08/974,100

[22] Filed: Nov. 19, 1997

Related U.S. Application Data

[63] Continuation of application No. 08/647,409, May 9, 1996, Pat. No. 5,804,005.

[51] Int. Cl.7 .................................. D04H 5/04; B05D 1/12
[52] U.S. Cl. .................... 156/62.2; 156/245; 156/283; 156/296; 156/330; 264/122; 264/219; 264/257
[58] Field of Search ............................... 156/62.2, 308.2, 156/330, 283, 296, 245; 264/122, 109, 257, 219

[56] References Cited

U.S. PATENT DOCUMENTS

| | | |
|---|---|---|
| 3,723,223 | 3/1973 | Le Compte . |
| 3,765,971 | 10/1973 | Fleissner . |
| 3,993,518 | 11/1976 | Buck, Jr. et al. . |
| 3,997,942 | 12/1976 | Buck, Jr. et al. . |
| 4,012,549 | 3/1977 | Slysh . |
| 4,047,991 | 9/1977 | Buck, Jr. et al. . |
| 4,051,294 | 9/1977 | Buck, Jr. et al. . |
| 4,053,673 | 10/1977 | Buck, Jr. et al. . |
| 4,053,674 | 10/1977 | Buck, Jr. et al. . |
| 4,147,737 | 4/1979 | Sein et al. . |
| 4,211,817 | 7/1980 | Buck, Jr. et al. . |
| 4,363,680 | 12/1982 | Buck, Jr. et al. . |
| 4,448,941 | 5/1984 | Cheung et al. . |
| 4,457,793 | 7/1984 | Buck, Jr. . |
| 4,473,428 | 9/1984 | Buck, Jr. et al. . |
| 4,528,127 | 7/1985 | Holderegger et al. . |
| 4,550,050 | 10/1985 | Buck, Jr. . |
| 4,585,685 | 4/1986 | Forry et al. . |
| 4,609,686 | 9/1986 | Giordano, Jr. et al. . |
| 4,850,584 | 7/1989 | Buck . |
| 4,869,950 | 9/1989 | Elsen et al. . |
| 4,874,661 | 10/1989 | Browne et al. . |
| 5,100,435 | 3/1992 | Onwumere . |
| 5,321,100 | 6/1994 | Belder et al. . |

*Primary Examiner*—Sam Chuan Yao
*Attorney, Agent, or Firm*—McDermott, Will & Emery

[57] ABSTRACT

A process is described for producing a bonded, non-woven fibrous batt by the use of a dry, solid, particulate, latent-cross-linkable, thermosetting, fiber-binder. This fiber-binder is an intimate mixture of a solid epoxy resin and a cross-linking agent. The epoxy resin has (a) terminal epoxy groups; (b) an epoxide equivalent weight of above about 500; (c) a glass transition temperature above about 40° C.; and (d) a melting point above about 70° C. In the process the fiber-binder contacts the fibers to form a raw batt with the fiber-binder loosely adhering to the fibers of the batt. Then the raw batt is heated to a cross-linking temperature above the melting point of the fiber-binder but below the scorching or melting point of the fibers thereby melting the fiber-binder. The fiber-binder flows to intersections of the fibers and subsequently reacts the cross-linking agent with the terminal epoxy groups of the epoxy resin. This converts the raw batt into a hot cross-linked batt. The hot cross-linked batt is then cooled to room temperature. Batts are also described as is a process for hot molding these batts.

35 Claims, 4 Drawing Sheets

FIG. 11

BONDING FIBROUS BATTS WITH THERMOSETTING FIBER-BINDERS OF CERTAIN EPOXY RESINS

This application is a continuation of application Ser. No. 08/647,409 filed May 9, 1996 now U.S. Pat. No. 5,804,005.

This invention relates to a process for the bonding of non-woven fibrous batts with certain fiber-binders, the resultant batts, and related products and processes.

BACKGROUND OF THE INVENTION

Some years ago processes were developed for producing a fibrous batt by contacting fibers with a dry fiber-binder based on certain thermoplastic polymers.

Such processes are described in the following US Patents among others:

Buck et al U.S. Pat. No. 3,993,518, "Buck '518"; and
Buck et al U.S. Pat. No. 3,997,942, "Buck '942"; and
Buck et al U.S. Pat. No. 4,047,991, "Buck '991"; and
Buck et al U.S. Pat. No. 4,050,997, "Buck '997"; and
Buck et al U.S. Pat. No. 4,051,294, "Buck '294"; and
Buck et al U.S. Pat. No. 4,053,673, "Buck '673"; and
Buck et al U.S. Pat. No. 4,053,674, "Buck '674" and
Buck U.S. Pat. No. 4,211,817, "Buck '817"; and
Buck et al U.S. Pat. No. 4,363,680, "Buck '680"; and
Buck U.S. Pat. No. 4,550,050, "Buck '050"; and
Buck U.S. Pat. No. 4,457,793, "Buck '793"; and
Buck et al U.S. Pat. No. 4,473,428, "Buck '428"; and
Buck U.S. Pat. No. 4,850,854, "Buck '854"; and
Elsen U.S. Pat. No. 4,869,950, "Elsen".

These prior processes have proven very useful for a number of reasons. First, the noted processes can utilize inexpensive recycled fibers. Such fibers are recovered from garment clippings, textile mill waste and other waste fibrous products. These materials are sometimes referred to as "shoddy". Second, the patented processes are anhydrous, that is, completely dry, employing neither water nor solvent. Third, the fiber-binder employed is in its solid powdered form.

Batts produced by these prior processes find a wide variety of uses. They are useful as pads in mattresses, furniture, chairs and automobile seats. They are also useful as carpet underlay. In fact, these batts can be employed anywhere it is desired to provide resilience, thermal insulation, sound insulation and/or cushioning. These batts can be covered with other fabric or they may be visible to the naked eye. Said batts can be used almost everywhere that rubber or polyurethane foam have been used in the past. Such batts are, however, superior to foam for many reasons, particularly because they have a greater life under use. Because of their great utility these prior batts have achieved great commercial success. They are currently produced all over the world in quantities greater than about 25 million kilograms, about 25,000 tons, per year.

One disadvantage is the relatively high melting point of the thermoplastic resins used as fiber-binders. For example, a batt bonded with a dibutyl maleate copolymer must be heated to about 195° C. (383° F.). Such a high melting point is expensive to maintain because of energy costs. Such a high melting point increases the possibility of adverse heat effects on components of the batt. The higher the melting point of the thermoplastic resin in the fiber-binder, the greater the danger that it or other components of the batt will catch fire.

Unfortunately these prior batts and processes for their production suffer from a number of disadvantages. Batts bonded with fiber-binders of chlorine-containing thermoplastic resins suffer from a number of disadvantages. These chlorine-containing resins employ polymers which include vinyl chloride and/or vinylidene chloride. In these batts, a danger exists that an undesirable release of hydrochloric acid will occur. This hydrochloric acid causes a number of problems in both processes for producing the batts and in methods of using the resultant batts because hydrochloric acid, which is toxic and highly corrosive, must be contained in the process apparatus. Such apparatus must be constructed with an airtight enclosure and with a fan to keep the enclosure under a negative air pressure. If the apparatus is opened for inspection, adjustment or repair, workers may be exposed to the HCl toxic vapors. The vapors escaping from the unit must be contained. Repair costs are increased because of the hydrochloric acid. Provision must be made to safeguard workers. The hydrochloric acid must be neutralized, usually with caustic (NaOH) or lime (CaO), producing as neutralization products respectively impure salt (NaCl), and impure calcium chloride ($CaCl_2$). These neutralization products must be disposed of in a manner consistent with a proper regard for the environment. Such disposal is expensive, but vital. Some environmentalists have suggested that a relationship exists between chlorine and the presence in the environment of dioxin.

While the chlorine in these chlorine-containing batts tends to make the resultant batts somewhat fire resistant, chlorine alone is frequently insufficient. It has become common practice to improve the fire resistance of the batts by the addition of antimony oxide, boric acid, diammonium phosphate and/or aluminum trihydrate. Unfortunately, such added materials tend to increase the propensity of the chlorine-containing fiber-binder to decompose with a resultant undesirable release of hydrochloric acid. This hydrochloric acid must be captured and scrubbed from the effluent stacks to prevent undesirable air pollution. The amount of hydrochloric acid released during curing of the batt increases sharply at temperatures above 205° C. (400° F.). The effluent by-products produced during batt curing may produce effluent opacities above acceptable limits. Expensive emission control devices are required for monitoring and control.

After formation of these prior batts with white fibers and chlorine-containing resins, yellowing of the fibers may occur. Where the fibers are visible, consumer demand is diminished.

The prior batts produced with chlorine-containing fiber-binders, when used in upholstery with steel springs, are believed to catalyze rusting of the springs. This can result in undesirable squeaking of the springs.

Batts bonded with chlorine-containing resins have been rejected for use as padding for seats and panels in automobiles. Automobile manufacturers fear that any hydrochloric acid release would damage the printed circuits that are part of the computer and electronic components of modern autos.

Many of the prior batts bonded with thermoplastic resins give off a gummy vapor when heated. This gummy vapor appears to come from plasticizers which have been mixed with the resin. Examples of plasticizers are dioctyl phthalate and epoxidized soy bean oil. During the heating process these plasticizers are released. The plasticizers can condense as oily residue on top of the neutralization solution, making disposal expensive. They can also condense as a gummy residue which may ignite in oven exhaust causing fires. Removing this residue is time consuming and expensive.

One automobile manufacturer has promulgated an empirical test to measure the suitability of batts for use as padding under the carpet of automobiles. In this empirical test, a sample of the batt is exposed to a temperature of 232° C. (450° F.) for a period of one hour to simulate heating through the automobile floor by the catalytic converter. After the heating period, the pad is examined to determine whether (1) it has produced any odor, (2) it has discolored and (3) it has lost its shape. The prior batts bonded with chlorine-containing fiber-binders fail this test.

As described in the prior art, these prior thermoplastic binders must be utilized in the form of small particles. One method is to polymerize monomers producing directly a resin of the desired particle size. The high cost of this method makes it commercially impractical. A less expensive method is to form the resin without regard to particle size and then grind it to the desired size. Unfortunately, some of these prior thermoplastic binders are relatively soft and require very long grinding times to achieve the desired particle size. Because of their softness the particles tend to deform rather than fracture. Grinding at cryogenic temperatures is of limited success, but is expensive.

In recent years the cost of all the noted prior thermoplastic fiber-binders has increased dramatically. This increase has resulted in increased costs for products employing such prior batts, leading to the substitution of other, inferior, less expensive products.

A great deal of effort has been expended in attempting to reformulate these resins economically to lower their melting points. Unfortunately, these attempts have met with only very limited success. In one attempt, a copolymer of vinylidene chloride and vinyl chloride was converted to a terpolymer by introducing other vinyl monomers, such as vinyl acetate and dibutyl maleate. It was believed that the resultant terpolymer would have a melting point lower than that of the copolymer. In another attempt, mixtures or alloys of two or more thermoplastic resins were employed. An attempt to use polyolefins was unsuccessful because of difficulty in grinding and the propensity of the polyolefins to produce, during grinding, fibers rather than small particles.

More recently some success has been achieved when the prior thermoplastic fiber-binder is contacted with the fibers of the batt by blowing it through a fully formed batt. However the thickness of such a batt is limited to about 5 cm (2 inches) because of the tendency of the thermoplastic fiber-binder to fail to penetrate the batt fully. Increasing the air speed through the batt has been only partially successful. As a result, such process is limited to those employing preformed batts of less than 7 cm (3 inches).

These prior batts can be cold molded but cannot be hot molded. In the cold molding process, the batt is heated and placed in a cold mold until the batt cools to the temperature of the mold. In the hot molding process, the batt is placed in a hot mold. After a certain time, the batt is removed from the hot mold. A demand exists for batts which can either be hot molded or cold molded.

A completely unrelated, non-analogous field of electrostatic coating also has a number of problems related to the disposal of waste coating powders. In this field, the substrate to be coated, which may be an automobile body, is given an electrical potential different from a powder spray gun. Coating powder is projected through said gun in a gas stream toward the substrate. Some of the coating powder does not adhere to the substrate and is collected as scrap. A portion of the powder, which is entrained in the air, is then recovered in filters as scrap. Much of this scrap cannot be reused without adversely affecting the resultant coatings. The scrap must be disposed of in an environmentally responsible manner. The disposal of this scrap is a burden on the coating factory. Some factories burn the scrap, whereas others pay to have it transported to an acceptable land fill. Today, millions of pounds of scrap material are injected into the environment annually. If the scrap is burned a danger exists of contributing to air pollution. If the scrap is placed in a land fill a danger exists of contaminating drinking water sources.

Other "off-grade" or scrap material is available from the manufacturer of the coating powder because of defects, poor color and/or the presence of contaminants that make the material unsuitable for use in the powder coating industry. Such material poses a similar disposal problem.

OBJECTS OF THE INVENTION

Accordingly it is an object of the present invention to provide an improved process for the production of fibrous batts substantially free from one or more of the disadvantages of prior processes.

Another object of the present invention is to provide an improved fibrous batt substantially free from one or more of the problems of prior batts.

Still another object is to provide a process and batt utilizing a fiber-binder which is free from chlorine.

Yet another object is to provide an improved process which does not release hydrochloric acid.

Still another object is to provide an improved process which can employ, as a fiber-binder, a recycled, readily available material.

An additional object is to provide an improved process wherein a preformed batt of greater than about 7 mm (¼ inch) can be contacted with a fiber-binder and be adequately bonded.

Still another object is to provide an improved process wherein the bending resistance of the batt can be achieved by simply controlling the time and temperature at which the batt is cured.

Yet another object is to provide an improved process wherein the particles of fiber-binder have a greater affinity for the fibers than heretofore.

An additional object is to provide an improved process employing lower temperatures than previously possible, with a resultant energy savings.

Still another object is to provide an improved process, for producing an improved batt, equivalent in properties to prior batts, but employing less fiber-binder.

An additional object is to provide improved bonded fibrous batts and process for their production, which process employs a fiber-binder that can readily and inexpensively be ground to the desired particle size.

Yet another object is to provide an improved process which does not deposit a gummy residue during the heating step required during batt formation Still another object is to provide a batt which can be both cold molded and hot molded. In this connection, it is particularly important to provide a process for making a batt which does not require a toxic resin like phenol formaldehyde.

Another object is to provide an improved batt which meets the tests for usefulness as an automobile carpet pad.

A further object is to provide a process for producing a hot moldable batt without requiring the use of phenolic resins which produce toxic fumes, undesirable odor, and unacceptable odor from the curing ovens.

The above and other objects are accomplished by providing improved bonded fibrous batts and a process for their production as described in the following description and drawings.

SUMMARY OF THE INVENTION

According to the present invention, there is provided a process for producing a bonded, non-woven, batt of fibers having the following steps:

I. providing a dry, solid, particulate, latent-curable, thermosetting, fiber-binder which is an intimate mixture of:
   A. a solid epoxy resin having: (a) epoxide groups; (b) an epoxide equivalent weight of above about 500; (c) a glass transition temperature above about 40° C.; (d) a melting point above about 70° C.; and
   B. a coreactive effective amount of a cross-linking agent which reacts with the epoxide groups of the epoxy resin; and then II. contacting fiber-binding amounts of the fiber-binder with the fibers to form a raw batt with the fiber-binder loosely adhering to the fibers of the batt; and then III. heating the raw batt to a cross-linking temperature above the melting point of the fiber-binder but below the scorching or melting point of the fibers thereby melting the fiber-binder whereupon the fiber-binder flows to intersections of the fibers and subsequently at least partially reacts the cross-linking agent with the epoxide groups of the epoxy resin thereby converting the raw batt into a hot cured batt; and then

IV. cooling the hot cured batt.

Throughout this application, the hot cured batt is frequently referred to as a cross-linked batt or semi-cross linked batt to further distinguish the mechanism of the inventive process from the prior art. However, it should be understood that the batt itself is only physically cross-linked with the melted particles of resin which have themselves been cross-linked by the chemical reactions described herein.

According to another aspect of the present invention the time and temperature of the heating agent step, Step III, can be limited such that the cross-linking agent reacts with fewer than all the epoxide groups and preferably from about 5 to about 40 percent of the epoxide groups of the epoxy resin thereby converting the raw batt into a hot, semi-cross-linked batt which is subsequently cooled. This semi-cross-linked batt is then placed between open male and female molds. The molds are closed, causing the semi-cured batt to take the form of these molds. The male mold, the female mold, and the semi-cured batt are heated to a cross-linking temperature above the melting point of the fiber-binder but below the scorching or melting point of the fibers thereby melting the fiber-binder and reacting the cross-linking agent with the remaining epoxide groups of the epoxy resin. This converts the semi-cured batt into a fully cured batt in the form of shaped article.

DETAILED DESCRIPTION OF THE INVENTION

The epoxy resins useful in the present invention have epoxide groups, by which is meant one or more moieties of Formula I:

(I)

A large number of epoxy resins can be employed in the present invention. One preferred epoxy resin useful in fiber-binders of the present invention is the reaction product of bisphenol-A and epichlorohydrin, represented by Formula II, wherein "n" is generally from about 3 to about 12 and is preferably from about 3 to about 7.

(II)

Another preferred class of epoxy resins are those of Formula III, wherein each "p" is independently selected to be zero or 1, and wherein "q" is generally from about 3 to about 12 and is preferably from about 3 to about 7.

(III)

The epoxy resins of Formula III are frequently referred to as "epoxidized phenol novolacs" or "EPN" resins when "p" is zero, and as "epoxidized cresol novolacs" or "ECN" resins when "p" is one. Naturally these resins can be produced from mixtures of phenol and cresol.

The epoxy resins useful in the present invention generally have an epoxide equivalent weight of from about 500 to about 5000 and preferably from about 600 to about 3000. In the general case wherein they have about two epoxy groups per molecule, the molecular weight is about twice the above figures.

The epoxy resin generally has a glass transition temperature, frequently called "Tg", above about 40° C., and preferably above about 50° C., and a melting point above about 70° C. and preferably from about 80° C. to about 150° C.

The epoxy resin can have a widely varying particle size as long as it is solid. As is well-known in the resin art this resin is a mixture of individual molecules each having a different distinct molecular weight. The average molecular weight of the epoxy resin is between about 1000 and about 10,000 and is preferably between about 1200 and 6000. The epoxy resin can be linear or branched, preferably linear. It is, however, not cross-linked.

The epoxy resins useful in the fiber-binders of the present invention may be obtained from scrap powder paint which is available from, for example, paint manufacturers and ultimate users of powder paints. Synonyms of scrap powder paints include fines, oversized materials, distressed materials, obsolete materials, off-grade materials and off-spec materials, by which is meant materials which do not meet independent specifications and/or are out-dated.

The cross-linking agents useful with the selected epoxy resin are well-known. The cross-linking agents have two or more reactive groups which react with the epoxide groups of the epoxy resin. Examples of suitable cross-linking agents include: polycarboxylic acids, polycarboxylic acid anhydrides, acid terminated polyesters, polyfunctional amines, phenol/cresol novolacs, resinous phenolics, accelerated and substituted dicyandiamide derivatives and imidazole/epoxy resin adducts.

Examples of suitable polycarboxylic acids include among others: phthalic acid, isophthalic acid, terephthalic acid, trimellitic acid, maleic acid, adipic acid, decanedioic acid and dodecanedioic acid.

Examples of suitable polycarboxylic acid anhydrides include among others: phthalic anhydride, maleic anhydride, trimellitic anhydride, pyromellitic dianhydride (sometimes called "PMDA") and benzophenone tetradicarboxylic acid dianhydride (sometimes called "BDTA".

The acid terminated polyesters useful as cross-linking agents in the present invention are generally the reaction product of a polyol and a polycarboxylic acid. Useful polyols include among others: ethylene glycol, diethylene glycol, neopentyl glycol, propylene glycol, 1,4-butane diol, trimethylol propane and glycerol. Suitable polycarboxylic acids include all those listed above. Preferred acid terminated polyesters are described in U.S. Pat. No. 5,321,100 and in particular Example II, thereof and U.S. Pat. No. 4,147,737 and in particular Example IIa and IIIa thereof.

The preferred polyfunctional amines are secondary and tertiary amines which are known to react with epoxy groups at the desired reaction rate. One suitable amine is dicyandiamide. Although it can be used alone, it is commonly used with one or more imidazoles and/or one or more imidazolines. Examples of suitable imidazoles include among others: 2-methyl-imidazole, 2-phenyl-imidazole, and 2-ethyl-4-methyl-imidazole. Examples of suitable imidazolines include among others: 2-phenyl-imidazoline.

Phenolic cross-linking agents are also known to be reactive with epoxy resins and are useful in the present invention. The preferred phenolic cross-linking agents are novolac resins which function in the same manner as acid cross-linking agents. These phenolic cross-linking agents are produced by the reaction of formaldehyde and phenol and/or cresol with an acid catalyst. Preferred phenolic cross-linking agents are those of Formula IV, shown wherein "r" is equal to about 1 to about 20 and preferably from about 2 to about 10; wherein each "s" is independently selected from zero and one.

(IV)

These phenolic cross-linking agents function in a manner similar to carboxylic acids. Such phenolic cross-linking agents can be used alone, but are frequently employed with a bisphenol cross-linking agent. Preferably bisphenol-A is used as the cross-linking agent, as described below.

The cross-linking agent can be a bisphenol cross-linking agent. Synthesis of these cross-linking agents is well-known in the art. These cross-linking agents are synthesized from a bisphenol, such as bisphenol-A, and epichlorohydrin in a substantially identical manner to the synthesis of epoxy resins of Formula II, but in the case of these cross-linking agents, an excess of the bisphenol is employed. The preferred bisphenol cross-linking agents are those of Formula V, wherein "t" is generally from about 3 to about 12 and is preferably from about 3 to about 7.

(V)

The fiber-binder can be formulated by a wide variety of well-known methods. One method is simply to mix the finely divided epoxy resin and the finely divided cross-linking agent and any other ingredients. All ingredients are then briefly heated until they melt. Said ingredients are then rapidly cooled before any substantial cross-linking reaction takes place between the epoxy resin and the cross-linking agent. The exact degree to which cross-linking has taken place is difficult to determine but it is estimated that fewer than ten percent of the epoxide groups are reacted with the cross-linking agent. The cooled ingredients, which are frequently in the form of a solid sheet, are then comminuted to the desired particle size.

As is well-known in the art, as soon as an epoxy resin is mixed with the cross-linking agent, the cross-linking react ion begins slowly to take place. Lower temperatures inhibit the reaction, whereas higher temperatures favor it. As the reaction progresses, those skilled in the art have identified three distinct stages, namely: the "stage", where the mixture is soluble in organic solvents, but is fusible, by which is meant it melts and flows; the "B-stage", wherein the mixture is fusible but insoluble; and the "C-stage", wherein the mixture is both insoluble and infusible.

The fiber-binders of the present invention go through these same stages. When first contacted with the fibers the fiber-binder is in the A-stage. When partially cross-linked the fiber-binder is in the B-stage. Batts having the fiber-binder in this stage can be hot or cold molded. When fully cross-linked the fiber-binder is in the C-stage.

In the fiber-binder, the epoxy resin is mixed with the cross-linking agent in a ratio such that there is about one epoxide group on the epoxy resin for each carboxyl or amine group on the cross-linking agent. There is no adverse effect if there is up to about 30% excess of either moiety. In other words, the equivalent ratio of the epoxy resin to the cross-linking agent is about 1.3:1 to about 1:1.3. As is well-known in the art, for a given quantity of an epoxy resin of a given equivalent weight a greater weight of the high molecular weight cross-linking agents must be employed compared to the monomeric cross-linking agents.

With due regard for the above equivalent ratios, the weight ratio of (A) the epoxy resin to (B) the cross-linking agent, namely the A:B ratio, is generally from about 100:3 to about 25:75 and preferably from about 100:4 to about 30:70.

The particles of the fiber-binder have an average size from about one to about 200 microns, preferably from about 5 to 50 microns. When the particles have a size smaller than 10 microns they can advantageously be mixed with particles having a larger size. If the average particle size is greater than about 40 microns there may be a reduced efficiency in the production of firm resilient batts.

The fiber-binder can be applied to the fibers in widely varying ratios but the fiber-binder generally comprises from 2 to 40 and preferably from 5 to 30 weight percent based on the combined weight of the fibers and the fiber-binder.

The fiber-binders of the present invention are solid; they are neither aqueous solutions, nor solutions employing other solvents. They are free from solvents and water.

Glass plate flow length is a significant characteristic of fiber-binders useful in the present invention. Glass plate flow length is determined by pressing the fiber-binder into a mold to form a pill or cylinder 12 mm in diameter and 6 mm high. This cylinder is placed on a hot plate at a temperature of 190° C. (375° F.) at an angle of 35° to the horizontal. The length of the streak made by the cylinder in one minute is termed the "hot plate flow". A fiber-binder in the C-stage that does not flow at all will have a glass plate flow of 12 mm, i.e., the diameter of the cylinder. Fiber-binders in the early A-stage can have glass plate flows that exceed 160 mm. Glass plate flow provides a simple and convenient method to determine the degree of cross-linking between the epoxy resins and the cross-linking agent. The described test also demonstrates one fiber-binder characteristic making the fiber-binder optimally useful in this invention. The fiber-binders of the present invention generally have glass plate flow lengths of from about 15 to about 150 mm and preferably from about 35 to about 125 mm. Others skilled in the art sometimes refer to "hot plate flow" as "glass plate melt flow" or "melt flow".

Fillers may be added to resins. Fillers are usually less expensive than resins. This permits a filled resin to be sold at a cost lower than a fiber-binder which is free from filler. Although fillers are not required to be present in the fiber-binders of the present invention, when present, they provide new and unexpected results. It is possible to use filled fiber-binders and achieve the same batt properties as with unfilled fiber-binders. While this effect is not fully understood, it is believed that after the comminution of the filled resin, particles of filler protrude from the surface of the fiber-binder particle. However, upon such particles being heated, a new and novel structure is produced. Apparently the mixture of epoxy resin and cross-linking agent melt and flow, completely surrounding the filler particle. This structure may be thought of as a concentric sphere with the melted, sticky, fiber-binder, then in the A-stage or early B-stage, forming a covering on the outside. This covering is completely adequate to bond with fibers.

The particles of the filler have an average size from about one to about 200 microns, preferably from about 5 to 15 microns. Smaller particle sizes are functional in the present invention, but may cause environmental problems because they tend to be respirable.

In general the fillers are inorganic and insoluble in water. Salts of strong acids and weak bases are suitable, as well as salts of weak acids and weak bases. Silica, alumino-silicates and alumina are all suitable classes. Examples of preferred fillers include, among others, calcium carbonate, barium sulfate, iron oxides, carbon black, and titanium dioxide.

The fiber-binder can include a wide variety of other additives. Examples of additives include among others: catalysts, dyes, pigments, flow control agents, fire-retardants, self extinguishing agents, desiccants and all manner of additives which are used herein for their known purposes. Any catalyst known to accelerate or retard the rate of reaction of the epoxide group and the active group of the cross-linking agent can be employed. Examples of such catalysts include among others: tertiary amines, amic acids and quaternary phosphonium compounds. Examples of fire retardants include: boric acid, monoammonium phosphate, diamonium phosphate and aluminum trihydrate. These additives can be in the form of liquids or particles so long as the fiber-binder remains solid, has the desired particle size and suffers no adverse affects.

The fibers can be contacted with the fiber-binder in a wide variety of ways. The fibers can be loose, in the form of a thin web, or in the form of a batt. The fiber-binder can be sprinkled on the fibers under the influence of gravity or can be entrained in a stream of gas or vapor, advantageously air. Any method which leaves the desired quantity of fiber-binder desirably distributed throughout the batt is acceptable.

A wide variety of fibers are useful in the present invention including both natural and synthetic fibers. Natural fibers include cotton, wool, jute, and hemp. Synthetic fibers include those of polyester, nylon, acrylic, rayon, glass and polypropylene. In fact, any fibers or mixture of fibers are acceptable, including those in which the fibers may be new and unused, known as virgin fibers, or those that are waste, reclaimed from garment cuttings, fiber manufacture or textile processing and which do not melt or decompose at temperature below 100° C. (212° F.). The preferred fibers are those having a denier of 1 to 22 although finer and coarser fibers are also sometimes useful.

The heating of raw batt containing the fibers and the uncured fiber-binder can be accomplished by any convenient means such as infrared, ultraviolet, or microwave but is most conveniently accomplished by hot air which is passed through the batt. This hot air is heated to a temperature above the melting point of the fiber-binder but below that temperature at which the fibers are adversely affected. Adverse effects include scorching or burning of cellulosic or wool fibers or melting or shrinking of synthetic resin fibers. The heating is generally done at a temperature of from about 100° C. (212° F.) to about 240° C. (465° F.) for a time sufficient to permit the fiber-binder to flow to the intersections of the fibers and to cross-link there. This is generally accomplished in from about twenty seconds to about ten minutes, and usually from one to five minutes. Such heating converts the raw batt into a hot cured batt.

After completion of the heating step, the hot cured batt is cooled, preferably to room temperature, by any of a wide variety of means. The batt can be passed through chilled rolls, air can be passed through the batt, the batt can be placed in a cooling chamber or some other means can be used for cooling the batt.

DETAILED DESCRIPTION OF THE DRAWINGS

Figure 1:
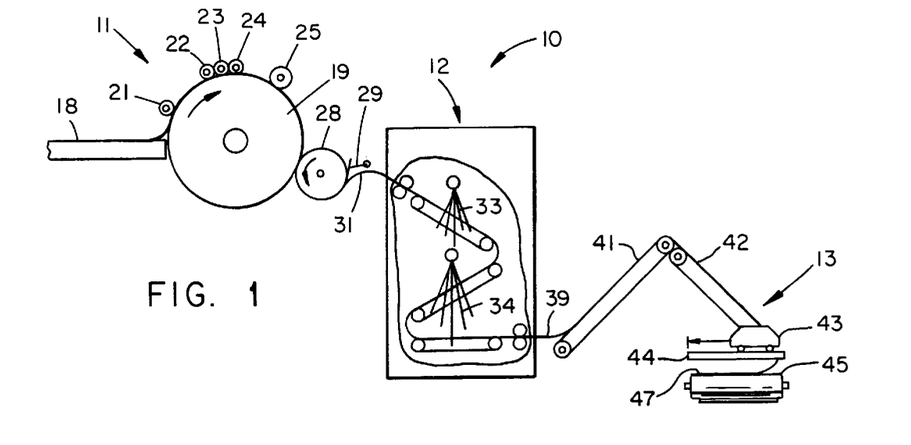
FIG. 1 is an elevational view of an apparatus suitable for practicing the process of the present invention.
Figures 2, 3:
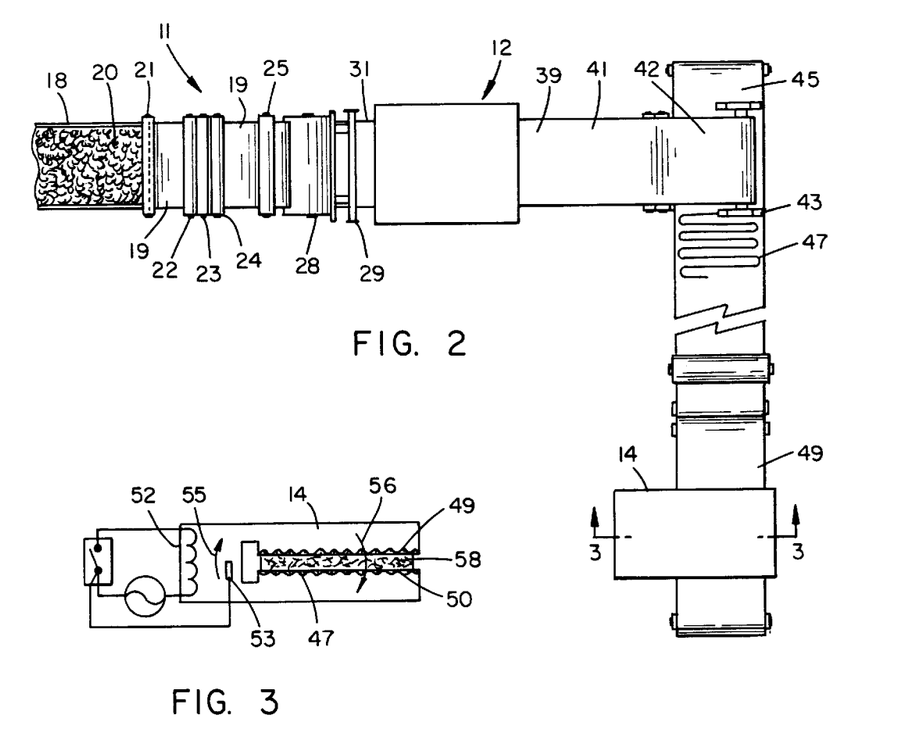
FIG. 2 is a plan view of the apparatus of FIG. 1.
FIG. 3 is a sectional view taken along line 3—3 of FIG. 2.

With reference to the drawings and in particular to FIG. 1, an apparatus 10 useful for practicing the process of the present invention is shown. The apparatus 10 comprises an opener or garnet 11, a fiber-binder dispenser 12, a cross laying mechanism 13 and, as shown in FIG. 2, an oven 14. The garnet 11 comprises an inlet chute 18 adapted to feed bulk fibers to the rotating drum 19 of the garnet 11. The garnet 11 is also provided with a plurality of tooth rolls 21, 22, 23, 24, 25 which together with the teeth (not shown) on the drum 19, take bulk fibers 20 and convert them to a web 31 which adheres to the drum 19. The web 31 adhering to the drum 19 is transferred to the drum 28 where it is removed by comb 29. The web 31 that is now only between one and 100 fibers thick and is barely self supporting, enters the fiber-binder dispenser 12. While in the fiber-binder dispenser 12, the web 31 is contacted with particles 33, 34 of fiber-binder. The structure and function of the dispenser 12 is described in detail in Buck '680 and in Buck '428.

A wide variety of other methods can be employed to contact the fiber-binder with the fibers. Another method performs the contacting of the fibers with the fiber-binder after the fibers have been opened and loosened from a compressed bale and at the stage when they are entrained in an air stream and prior to being deposited on a screen or in the slot of an air lay system for producing non-woven batts. Such air-lay systems of this type are well-known in the trade under the names Schirp, Rando Web, DOA, and others. Still another suitable method for contacting the fibers with the fiber-binder is described in Fleissner U.S. Pat. No. 3,765,971.

Instead of contacting the fibers with the fiber-binder while the fibers are in the form of a web as described above with references to the figures, the non-woven batt can be converted into its final form and the particulate fiber-binder blown through the entire batt. It has been unexpectedly found that the fiber-binders of the present invention penetrate these batts better than do the prior fiber-binders. Furthermore a greater percentage of the fiber-binder is retained in the batt than when prior fiber-binders are used. All such contacting methods are useful in the present invention so long as the contacting is effective.

With respect to FIGS. 1 and 2, the web 39 then goes to the conveyor 41 and thence to the conveyor 42. The lower end of the conveyor 42 is attached to a traveller 43 which moves back and forth on the track 44.

The conveyor 42 is positioned above and at right angles to the other conveyor 45. The apparatus 10 is adjusted such that the speed of the conveyor 42 is several times faster than the speed of the conveyor 45. By virtue of this speed difference, the web 39 is cross laid back and forth on the conveyor 45 thus forming a raw batt 47. In one embodiment of the invention, the raw batt 47 passes between an upper foraminous belt 49 and a lower foraminous belt 50 (See FIG. 3). While held between the belts 49, 50, the raw bat 47 passes into the oven 14.

As shown in FIG. 3, the oven 14 is provided with heating means 52 in which the temperature can be controlled by a thermostat 53. The oven 14 is also provided with air circulating means such as a fan (not shown) that causes the hot air to circulate in the direction shown by the arrows 55 and 56. This hot air heats and melts the particles 33, 34 of the fiber-binder causing them to flow to the intersections of the fibers and further causes them to cross-link, thereby hardening the fiber-binder. The resultant product is the finally fully cross-linked or partially cross-linked batt 58 depending on the temperature of the oven 14 and the length of time that the batt remained in the oven 14.

Figures 4, 5, 6, 7, 8, 9:
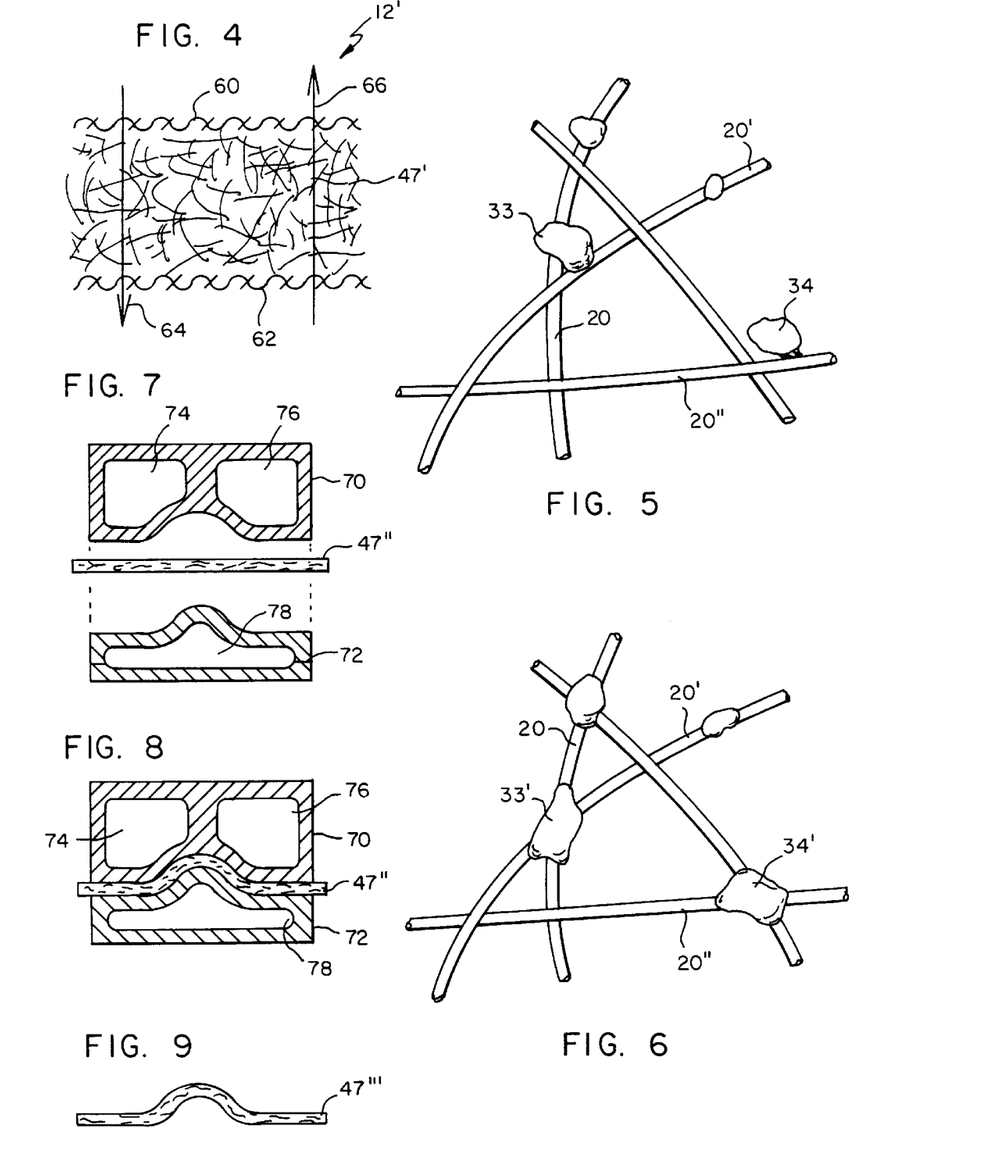
FIG. 4 shows a portion of another apparatus suitable for practicing the process of the present invention.
FIG. 5 is a schematic representation on a greatly enlarged scale showing the raw batt of the present invention with the particles of fiber-binder adhering to the batt prior to curing.
FIG. 6 is a view similar to that of FIG. 5 but showing the cured batt with the fibers bonded at their intersections with the fiber-binder of the present invention.
FIG. 7 is a schematic representation of a hot molding process employing a batt of the present invention at that stage of the process when the mold is open.
FIG. 8 is a schematic representation of a hot molding process employing a batt of the present invention at that stage of the process when the mold is closed.
FIG. 9 is a molded batt produced by the process of FIGS. 7 and 8.

In FIG. 4 there is shown an alternative particle dispenser 12' which takes the place of the particle dispenser 12 of FIGS. 1, 2, and 3. In the dispenser 12' a raw batt 47' exists between two foraminous belts 60, 62. Streams of air, represented by the arrows 64, 66, are passed through the bat 47'. These streams of air are laden with particles of fiber-binder. The particles loosely adhere to the fibers of the batt 47'. It has been found that fiber-binders of the present invention have a greater adherence to the fibers of the raw batt 47' than do the prior art thermoplastic fiber-binders.

As depicted in FIG. 5, particles, such as the particles 33, 34 of uncured fiber-binder, are adhering to fibers 20, 20', 20" of the raw batt 47, 47'. In FIG. 6, after heating, the particles, such as the particles 33, 34, have melted and have migrated to the intersections of the fibers 20, 20', 20". This heating has also caused the epoxy resin of the fiber-binder to react with the cross-linking agent of the fiber-binder thus cross-linking this thermosetting composition. The bending resistance and resilience of the batt are directly proportional to the extent of cross-linking. A small amount of cross-linking gives a soft resilient batt. If the resin is fully reacted with the cross-linking agent, i.e., the fiber-binder is in the C-stage, the batt will have maximum firmness and strength. All other things being equal the extent of cross-linking can be controlled by the temperature and time of heating for cross-linking. Lower temperatures and shorter times yield less cross-linking, while higher temperatures and longer times yield more cross-linking.

FIG. 7 illustrates the hot molding of batts of the present invention. Such batts can be hot-molded if the time and temperature of the heating step, Step III, is limited such that the cross-linking agent reacts with less than all the epoxide groups of the epoxy resin. In this case the resultant product will be a semi-cross-linked batt 47". The semi-cross-linked batt 47" is placed between an open male mold 70 and an open female mold 72. The male mold 70 is provided with passages 74, 76, adapted to receive a heated fluid such as steam or hot oil. Similarly the female mold 72 has a fluid receiving passage. Either or both of the molds can be heated by any other convenient means such as electrical resistance heating.

As shown in FIG. 8, the molds 70, 72 are closed causing the semi-cross-linked batt 47" to take the form of the molds 70, 72. Hot oil or steam under pressure is passed through the passages 74, 76, 78, heating the molds 70, 72, and thus heating the semi-cross-linked batt 47" to cross-linking temperature. This cross-linking temperature is above the melting point of the fiber-binder but below the scorching or melting point of the fibers thereby further reacting the cross-linking agent with the remaining epoxide groups of the epoxy resin. This converts the semi-cross-linked batt 47" into a fully cross-linked bat 47"' in the form of shaped article 47"' shown in FIG. 9.

Figure 12:
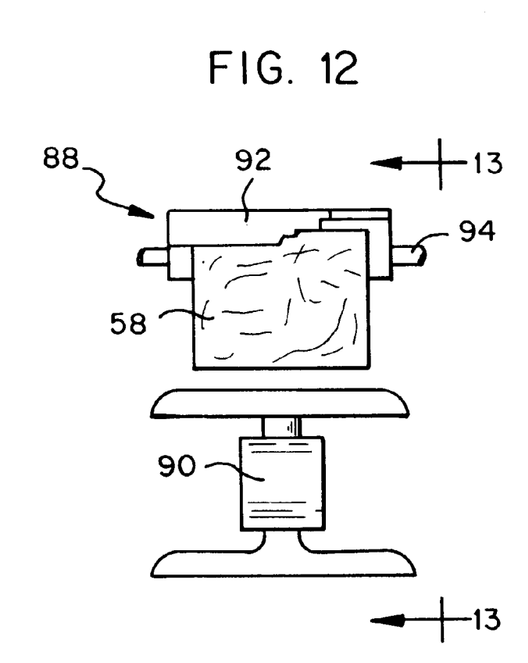
FIG. 12 is a side view of an apparatus used for measuring batt bending resistance as that term is used herein.
Figure 13:
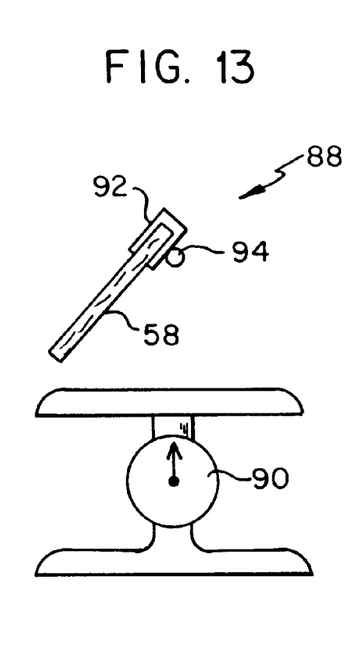
FIG. 13 is a view of the apparatus of FIG. 12 taken along line 13—13 of FIG. 12 before measuring.
Figure 14:
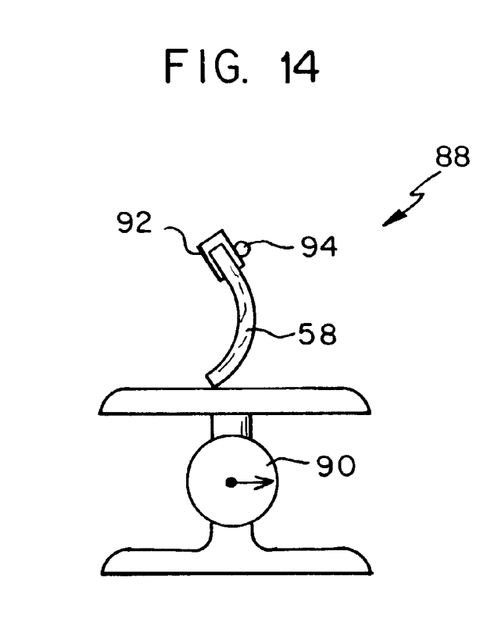
FIG. 14 is a view of the apparatus of FIG. 12 taken along line 13—13 of FIG. 12 during measuring.

FIGS. 12, 13, and 14 show the manner in which bending resistance is measured. FIGS. 12 and 13 show an apparatus 88 comprising a scale 90, with a clamp 92 carried by a rotatable shaft 94 mounted parallel to the scale 90 about 20 cm (8 inches) above it. The batt 58 is positioned in the clamp 92 and held above and out of contact with the scale 90 as shown in FIGS. 12 and 13. To measure bending resistance, the shaft 94 is rotated one full turn as shown in FIG. 14 and the highest reading on the scale 90 noted. In these tests the batt 58 has a width of 30 cm (12 inches) and a length of 30 cm (12 inches).

EXAMPLES

The invention will be better understood by reference to the following examples wherein all parts and percentages are by weight unless otherwise indicated. These examples are designed to teach those skilled in the art how to practice the present invention and represent the best mode presently known for carrying out the present invention.

Example 1

This example illustrates the synthesis of a preferred fiber-binder useful in the present invention. This fiber-binder uses "Epon 1007", a commercially available epoxy resin. This fiber-binder contains a filler.

The following quantities of the identified ingredients are combined as indicated.

| Item | Ingredient | Quantity in Grams |
|------|------------|-------------------|
| A | "Epon 1007" epoxy resin | 2500 |
| B | dicyandiamide | 125 |
| C | calcium carbonate | 1863 |
| d | poly (n-butyl acrylate) | 12 |

Items A, B, C, and D were thoroughly mixed at room temperature and then fed to an extruder in which heat friction and pressure combine to assure thorough mixing of the ingredients and thorough wetting of the calcium carbonate by the other ingredients. The temperature in the extruder is maintained at 140° C. whereupon a hot extrudate issues from the extruder. This extrudate is then rapidly cooled by being passed through the nip of two chilled rotating rolls where it exits as a sheet. The sheet is further cooled on a water cooled stainless steel belt. After being fully cooled the sheet is comminuted and classified to produce a fiber-binder called "Fiber-Binder-1", having a particle size of about 20 microns, which is useful in this invention.

Example 2

This example illustrates the synthesis of another preferred fiber-binder useful in the present invention. The fiber-binder uses "Epon 1009F", an epoxy resin different from that employed in Example 1. This fiber-binder contains no filler.

The following quantities of the identified ingredients are combined as indicated.

| Item | Ingredient | Quantity in Grams |
|------|------------|-------------------|
| A | "Epon 1009F" epoxy resin | 2500 |
| B | dicyandiamide | 125 |

The epoxy resin, namely "Epon 1009F", is commercially available from the Shell Chemical Company ("Shell"), 3200 Southwest Freeway, Houston Tex. 77027. It is the reaction product of bisphenol-A and epichlorohydrin, which corresponds to Formula II with "n" equal to 12 to 16. It has an epoxide equivalent weight of about 3000 as determined by Shell method HC-427C-81 employing perchloric acid. A 40 weight percent solution of this epoxy resin in methyl ethyl ketone has a viscosity of about 150 cps measured by Shell method HC-397A-87 at 25° C. It has a melting point of 135° C.

Items A and B were thoroughly mixed at room temperature and then rapidly heated over a period of three minutes to a temperature of 140° C. whereupon melting occurs to form a melted mass. This melted mass is kneaded for 30 seconds, thus producing an intimate mixture of its ingredients. The melted mass is then rapidly cooled by being passed through the nip of two rotating rolls cooled to room temperature, thus producing a self supporting sheet. This self supporting sheet is then comminuted and classified to produce a fiber-binder, termed "Fiber-Binder-2", having a particle size of about 35 microns, and useful in the described invention.

Example 3

This example illustrates the synthesis of a fiber-binder of the present invention employing an epoxy resin of Formula II and an acid terminated polyester.

The following quantities of the identified ingredients are combined as indicated.

| Item | Ingredient | Quantity in Grams |
|---|---|---|
| A | epoxy resin of Formula II | 50 |
| B | acid terminated polyester | 50 |
| C | calcium carbonate | 35 |
| d | poly (n-butyl acrylate) | 0.8 |

Item A has an epoxide equivalent weight of 800.

Item B has an acid number of 69. It is produced by following the procedure of Example IIIa appearing in Column 7 at about lines 52 through 59 of U.S. Pat. No. 4,147,737.

Item C has a particle size of five microns.

Items A, B, C, and D are placed in an extruder, where they ar thoroughly mixed and are forced through the barrel of the extruder at a temperature of 100° C. into the nip of rolls chilled to 10° C. to form a sheet. The sheet is then ground to a particle size of 25 microns and is termed "Fiber-Binder-3".

Example 4

This example illustrates the synthesis of a fiber-binder of the present invention employing an epoxy resin with amine cross-linking agents.

The following quantities of the following ingredients are combined as indicated.

| Item | Ingredient | Quantity in Grams |
|---|---|---|
| A | epoxy resin of Formula II | 100.0 |
| B | dicyandiamide | 5.0 |
| C | 2-phenyl imidazole | 0.3 |
| D | calcium carbonate | 35.0 |
| E | poly (n-butyl acrylate) | 0.8 |

Item A has an epoxide equivalent weight of 750.

Item D has a particle size of five microns.

Items A, B, C, D, and E are placed in an extruder, where they are thoroughly mixed and are forced through the barrel of the extruder at a temperature of 90° C. into the nip of rolls chilled to 10° C. to form a sheet. The sheet is then ground to a particle size of 10 microns and is termed "Fiber-Binder-4".

Example 5

This example illustrates the synthesis of a fiber-binder of the present invention employing a novolac as the epoxy resin.

The following quantities of the identified ingredients are combined as indicated.

| Item | Ingredient | Quantity in Grams |
|---|---|---|
| A | epoxy resin of Formula III | 100.0 |
| B | dicyandiamide | 5.0 |
| C | 2-methyl imidazole | 0.2 |
| D | titanium dioxide | 5.0 |
| E | barium sulfate | 30.0 |
| F | flow control agent | 0.8 |

Item A is a resin of Formula III wherein "p" is zero and "q" is four.

Item D is a particle size of less than one micron.

Item E has a particle size of ten microns.

Item F is a copolymer of 2-ethyl hexyl acrylate and n-butyl acrylate mixed in a molar ratio of 1:1 having a molecular weight of 3000.

Items A, B, C, D, E and F are thoroughly mixed and then placed in an extruder where they are melted and forced through the barrel of the extruder at a temperature of 90° C. into the nip of rolls chilled to 10° C. to form a sheet. The sheet is then ground to a particle size of 35 microns and is termed "Fiber-Binder-5".

Example 6

This example illustrates the synthesis of a fiber-binder of the present invention employing an epoxy resin with a phenolic cross-linking agent and a bisphenol cross-linking agent.

The following quantities of the identified ingredients are combined as indicated.

| Item | Ingredient | Quantity in Grams |
|---|---|---|
| A | epoxy resin of Formula II | 90.0 |
| B | epoxidized phenol novolac of Formula III | 10.0 |
| C | phenolic resin of Formula V | 36.0 |
| D | calcium carbonate | 50.0 |
| E | poly (n-butyl acrylate) | 0.8 |

Item A has an epoxide equivalent weight of 750.

In item B, the epoxidized phenol novolac resin is that of Formula III, where "p" is zero and "q" is four.

The phenolic resin of Item C is that of Formula V wherein "t" is 3. The mixture also contains a catalyst and free bisphenol-A.

Item D has a particle size of five microns.

Items A, B, C, D, and E are thoroughly mixed and then placed in an extruder where they are melted and forced through the barrel of the extruder at a temperature of 90° C. into the nip of rolls chilled to 10° C. to form a sheet. The sheet is then ground to a particle size of 15 microns and is termed "Fiber-Binder-6".

Examples 7–19

These examples illustrate the synthesis of fiber-binders useful in the present invention employing commercially available, known epoxy resins and commercially available, known, cross-linking agents other than those employed above.

The procedure of Example 1 is repeated employing the same quantities, ingredients, times and conditions, except that (a) the epoxy resin of Example 1 is replaced by the epoxy resin of Table 1, Column 2, and (b) the dicyandiamide is replaced by the cross-linking agent in Table 1, Column 3.

The epoxy resin (A) is mixed with the cross-linking agent (B) in the A:B weight ratio given in Column 4 of the following table. Similar fiber-binders are obtained.

TABLE 1

| 1. Example No. | 2. Epoxy Resin | 3. Cross-Linking agent | 4. A:B Ratio |
| --- | --- | --- | --- |
| 7 | Epon 2002 | Epi-Cure P-101 | 100:4.5 |
| 8 | Epon 2002 | Epi-Cure P-104 | 100:4.5 |
| 9 | Epon 2002 | Epi-Cure P-108 | 100:4.5 |
| 10 | Epon 2002 | Epi-Cure P-108 | 100:4.5 |
| 11 | Epon 1004 | trimelletic anhydride | 100:12 |
| 12 | Epon 2012 | Epi-Cure P-202 | 100:37 |
| 13 | Epon 2012 | McWhorter 30-3051 | 100:90 |
| 14 | Epon 2002 | Uralac P2230 | 100:145 |
| 15 | Epon 2002 | Uralac P2980 | 100:370 |
| 16 | GT 7013 | Epi-Cure P-108 | 100:4.5 |
| 17 | GT 7013 | Uralac P2980 | 100:100 |
| 18 | GT 7013 | Crylcoat 340 | 100:100 |
| 19 | GT 7013 | Rucote 551 | 100:100 |

The Epon epoxy resins of Examples 7 through 15 are available from Shell.

Epon 2002 is an epoxy resin. It is an adduct of epichlorohydrin and bisphenol-A, having a structure of Formula II and an epoxide equivalent weight of from about 675 to about 760.

Epon 1004 is an epoxy resin. It is an adduct of epichlorohydrin and bisphenol-A, having a structure of Formula II.

Epon 2012 is an epoxy resin. It is an adduct of epichlorohydrin and bisphenol-A, modified with an epoxidized phenol novolac to enhance functionality. It has an epoxide equivalent weight of from about 510 to about 570.

GT 7013 is an epoxy resin useful in the present invention. It is available from the Ciba Geigy Corp., 281 Fields Lane, Brewster, N.Y. 10509.

The "Epi-Cure" cross-linking agents are available from Shell. "Epicure 101" is an amine cross-linking agent said by its manufacturer to give faster cures than available from dicyandiamide. It has an alkalinity of about 3.5 meg/gm, a melt viscosity of 40 poise measured at 150° C.

"McWhorter 30-3051 is an acid functional polyester resin with an acid number of between 85 and 100. It is available from McWhorter Technologies of 1028 Third Street South, Minneapolis Minn. 55415.

The "Uralac" cross-linking agents are acid functional polyester resins. They are available from DSM Resins US Inc. of 31 Columbia Nitrogen Road, Augusta, Ga. 30903.

The "Crylcoat" cross-linking agents are available from UCB Corporation, 200 Lake Park Drive, Smyrna, Ga. 30080.

The "Crylcoat 340" is an acid terminated polyester with a Tg of 62° C. (144° F.), and an acid number of 70.

The "Rucote" cross-linking agents are available from the Ruco Polymer Corporation, New South Road, Hicksville, N.Y. 11802. Rucote 551 is an acid terminated polyester with a viscosity of 25 poise measured at 200° C., a hydroxyl number of less 10, and an acid number of 85, an acid equivalent weight of 660.

Example 20

This example illustrates the process of the present invention employing the fiber-binder of Example 1.

"Fiber-Binder-1" is employed in the process described herein with respect to the FIGS. 1, 2, and 3. The particles of fiber-binder are dispensed in the dispenser 12 such that the resultant batt 58 has a fiber-binder content of 15 percent by weight based on the weight of the resultant batt 58, i.e., based on the combined weight of the fibers and the fiber-binder. The batt is produced from a mixture of equal parts of fibers of cotton and fibers of poly(ethylene terephthalate) polyester. The oven 14 is maintained at a temperature of 175° C. (350° F.). The absence of any hydrochloric acid vapors coming from the oven 14 was noted.

Examples 21, 22 and 23

These inventive examples illustrate the ability to control tensile strength and flexural rigidity by the use of different oven temperatures.

The procedure of Example 20 is repeated employing the same quantities, ingredients, times and conditions except that the oven temperatures were those recorded in Table 2, Column 4.

Example 24

This comparative example is not representative of the present invention. Rather this example shows certain undesirable characteristics when the fiber-binder is one of the prior art thermoplastic polymers rather than the epoxy-resin based thermosetting resin fiber-binders of the present invention.

The procedure of Example 20 is repeated employing the same quantities, ingredients, times and conditions except that (a) the fiber-binder was replaced with an equal weight of a copolymer of vinylidene chloride and vinyl chloride (VDC-VC) and (b) the oven temperatures were those recorded in Column 4 of Table 2.

The results are recorded in Table 2. In Column 2 "I" means the example referred to in Column 1 is "Inventive"; whereas "C" means that the example is not of the present invention but rather is "Comparative".

EXAMPLE 2

| 1. Example No. | 2. I or C | 3. Fiber-binder | 4. Oven temperature | 5. HCl noted |
| --- | --- | --- | --- | --- |
| 21 | I | Epoxy-Ex. 1 | 175° C. (350° F.) | No |
| 22 | I | Epoxy-Ex. 1 | 205° C. (400° F.) | No |
| 23 | I | Epoxy-Ex. 1 | 232° C. (450° F.) | No |
| 24 | C | VDC-VC | 210° C. (410° F.) | Yes |

By reference to Table 2 it can be seen that only the prior art thermoplastic, vinylidene chloride, vinyl chloride-containing fiber-binder of Example 24 emits hydrochloric acid. The thermosetting fiber-binders of the present invention of Examples 21, 22, and 23 do not. No hydrochloric acid is noted from the inventive fiber-binders even at an oven temperature of 232° C. as shown in Example 23, even though that temperature is some 22° C. higher than the temperature employed in Example 24 in the case of the prior art fiber-binder.

Example 25

This comparative example is not illustrative of the present invention but rather shows the production of a batt employing a prior thermoplastic resin. Certain properties of this prior art batt are compared in subsequent examples with properties of batts of the present invention.

The oven 14 of the apparatus shown in FIGS. 2 and 3 is set at 210° C. (425° F.) and a mixture of about one half polyester shoddy and one half cotton shoddy is fed to the garnet 11. A thermoplastic fiber-binder which is a copolymer of vinylidene chloride and vinyl chloride is added in the dispenser 12 at the level of 15 weight percent based on the combined weight of the shoddy and the fiber-binder. The resultant batt is termed "Comparative Batt 25". The bending resistance of Batt 25 is measured in the transverse direction and the results recorded in Table 3. The bending resistance of Batt 25 is measured in the machine direction and the results recorded in Table 4. The machine direction is sometimes called the "running direction" and is the direction of travel of the foraminous belt 49. The transverse direction is 90° to the machine direction in the plane of the machine direction.

Example 26

This example is illustrative of the present invention. The procedure of Example 25 is repeated employing the same times conditions and ingredients except that the prior art thermoplastic fiber-binder is replaced by a thermosetting fiber-binder useful in the present invention to produce an inventive batt termed "Inventive Batt 26".

The results are recorded in Tables 3 and 4. The data recorded in Tables 3 and 4 is repeated in the graphs included as FIGS. 10 and 11.

Figure 10:
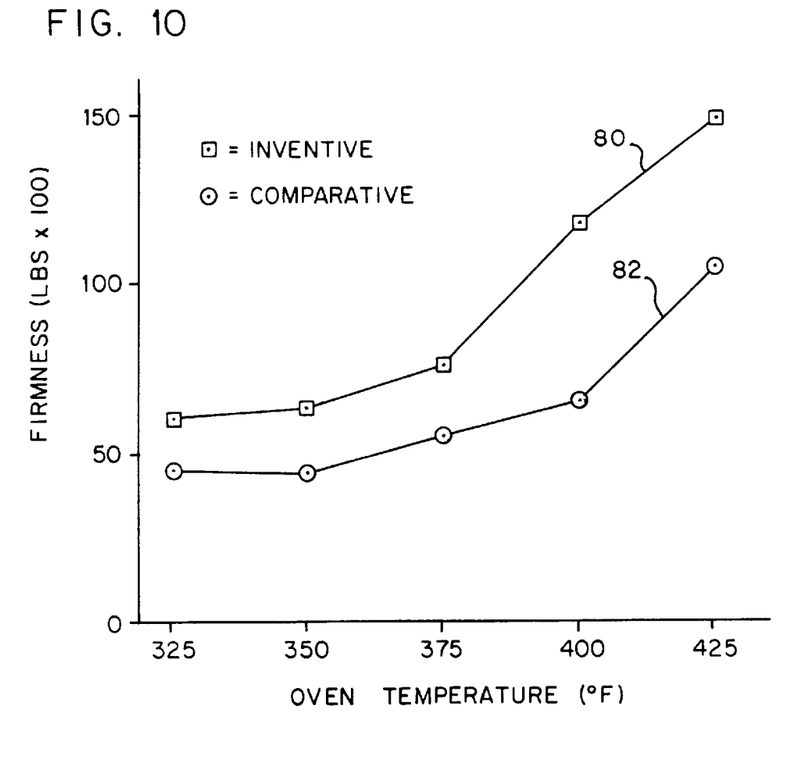
FIG. 10 is a graph showing the unexpectedly greater bending resistance of batts of the present invention compared with those of the prior art when bending resistance is measured in the transverse direction.

In FIG. 10 the data for transverse bending resistance of inventive batt 26 are shown by the curve 80, whereas the data for prior art Comparative Batt 25 are shown by the curve 82.

Figure 11:
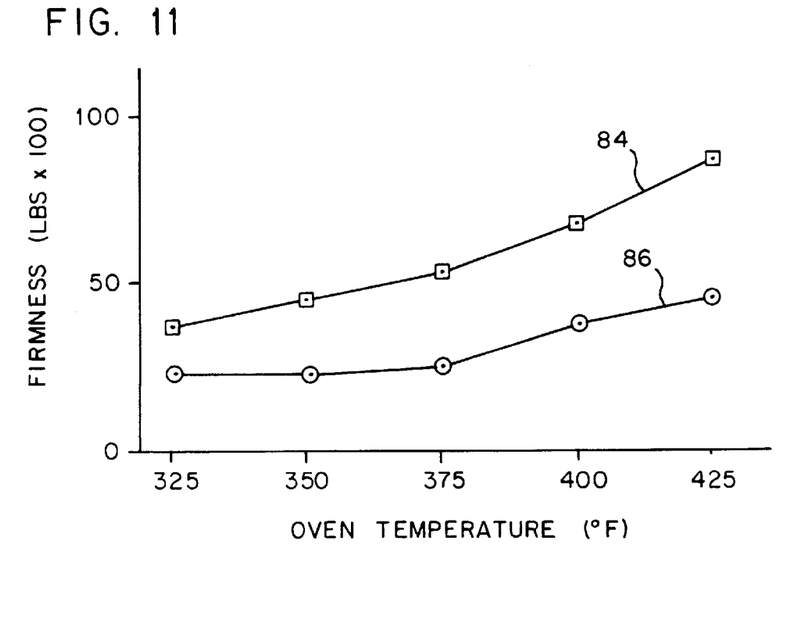
FIG. 11 is a graph showing the unexpectedly greater bending resistance of batts of the present invention compared with those of the prior art when bending resistance is measured in the running or machine direction.

Similarly, in FIG. 11 the data for bending resistance in the machine or running direction of Inventive Batt 26 are shown by the curve 82, whereas the data for prior art Comparative Batt 25 are shown by the curve 84. Comparing Curve 80 to 82 and curve 84 to 86, one can see that, because an approximately one third firmer batt is achieved under widely varying oven temperatures, approximately one quarter less of the thermosetting fiber-binder can be employed compared with the prior art thermoplastic binder. Such a tremendous improvement in a mature industry yields substantial savings.

TABLE 3

BENDING RESISTANCE IN THE TRANSVERSE DIRECTION
AT VARYING OVEN TEMPERATURES
FOR CERTAIN INVENTIVE AND COMPARATIVE BATTS

| 1. Oven Temperature (° C. and ° F.) | 2. Bending resistance of Comparative Batt (hundredths of pounds) | 3. Bending resistance of inventive Batt (hundredths of pounds) |
| --- | --- | --- |
| 163° C. (325° F.) | 46 | 60 |
| 177° C. (350° F.) | 44 | 63 |
| 190° C. (375° F.) | 56 | 77 |
| 204° C. (400° F.) | 66 | 119 |
| 218° C. (425° F.) | 106 | 150 |

TABLE 4

BENDING RESISTANCE IN THE RUNNING DIRECTION
AT VARYING OVEN TEMPERATURES
FOR CERTAIN INVENTIVE AND COMPARATIVE BATTS

| 1. Oven Temperature (° C. and ° F.) | 2. Bending resistance of Comparative Batt (hundredths of pounds) | 3. Bending resistance of inventive Batt (hundredths of pounds) |
| --- | --- | --- |
| 163° C. (325° F.) | 23 | 37 |
| 177° C. (350° F.) | 23 | 46 |
| 190° C. (375° F.) | 26 | 52 |
| 204° C. (400° F.) | 39 | 67 |
| 218° C. (425° F.) | 43 | 86 |

Example 27

This example illustrates the improved resilience of batts of the present invention compared with prior batts.

Resilience is measured by determining the percent recovery when a weight is placed on a batt and is then removed. A batt which recovers more is said to have greater resilience. More particularly the batt to be tested is placed on a flat unyielding surface. Its initial height is measured. A substantially weightless flat round presser foot having a diameter of 20 mm (0.785 inches) and therefore having an area of one square inch is placed on the batt and its height noted. A weight of 2.27 kg (5 pounds) is placed on the presser foot for about one minute thus depressing the batt. The weight is removed and the height after depression is noted. The percent recovery is 100 times the height after depression divided by the initial height. Higher percent recoveries are desirable.

Comparative Batt 25 has a percent recovery of only 82 percent whereas Inventive Batt 26 has a recovery of 89 percent.

Example 28

This example illustrates the process of the present invention to produce a batt of the present invention employing a fiber-binder which is solid commercially as a powder coating.

A coating powder sold by PPG Industries, Inc., (PPG), One PPG Place, Pittsburgh, Pa. 15272, USA, under the tradename "ENVIRACRYL POWDER COATING, PCV 70101", is fed to the dispenser 12 of the apparatus of FIGS. 1, 2, and 3, and is added to a batt of cotton fibers at the level of 15 percent. The temperature of the oven 14 is maintained at 177° C. (350° F.). No hydrochloric acid is noted. The resultant batt has excellent mechanical properties.

PPG reports that this fiber-binder has a density of 10.4 pounds per gallon; a specific gravity of 1.25; a gel time at 375° F. of 175 seconds; a glass plate flow of 125 mm at 300° F. with a 0.65 gram sample; an impact strength of 160 inch pound measured according to ASTM D-2794-84; a 100 percent adhesion measured by ASTM D-3359-83; and a humidity resistance of over 100 hours measured by test 463PB-9-01.

Upon information and belief, this fiber-binder is a mixture of an epoxy resin of Formula II with "n" equal to 4, and an acid terminated polyester mixed with 2 to 5 percent barium sulfate and 2 to 5 percent titanium dioxide. The results of this example is summarized in Table 5.

The resultant batt is termed "Batt 28".

Examples 29 to 37

These examples illustrate the production of batts by the process of the present invention employing commercially available fiber-binders which are sold by their manufacturers as powder paints.

The procedure of Example 28 is followed exactly with the single exception that the fiber-binder used therein is replaced by the fiber-binder given in the following table with similar results. The manufacturer listed in Column 4 offers for sale as powder paints, the following products under the tradenames listed in Column 2 and under the manufacturers' identifying code listed in Column 3. No hydrochloric acid is given off during the production of these batts. These batts all have superior mechanical properties.

| 1. Example Number | 2. Tradename | 3. Identifying Code | 4. Number of Manufacturer |
|---|---|---|---|
| 28 | Enviracryl | PCV 70101 | PPG |
| 29 | Enviracryl | PCV 70100 | PPG |
| 30 | Vitralon | 81-2284 | Pratt and Lambert |
| 31 | Vitralon | 81-2189 | Pratt and Lambert |
| 32 | Interpon | AJ006U | International Paint Inc. |
| 33 | Interpon | EA073U | International Paint Inc. |
| 34 | Bright White | 43-61-10 | Lilly |
| 35 | Epox | IF-2968-D | Fuller |
| 36 | Corvel | 10-2050 | Morton |
| 37 | Corvel | 40-7134 | Morton |

PPG describes Enviracryl "PCV 70100" as a material with glass plate flow of 125 mm and a gel time at 190° C. (375° F.) of 175 seconds.

Pratt and Lambert, P.O. Box 2153, Wichita, Kans. 67201, describes "Vitralon 81-2284" as a powder coating composition of a resin of a diglycidyl ether of bisphenol-A filled with 25 percent by weight titanium dioxide and 20 percent by weight hydrated silica.

Pratt and Lambert describes "Vitralon 81-2189" as a powder coating composition of a resin of a diglycidyl ether of bisphenol-A filled with 10 percent by weight titanium dioxide.

International Paint Inc. describes "Interpon AJ006U" as a product of isopropylidenediphenol filled with 20 percent by weight titanium dioxide and 30 percent by weight calcium carbonate.

International Paint Inc. describes "Interpon EA073U" as a diglycidyl ether of bisphenol-A filled with 40% by weight titanium dioxide and 5 percent by weight aluminum hydroxide.

Upon information and belief, "Bright White 43-61-10" by Lilly Industries, Inc. 1136 Fayette, North Kansas City, Mo. 64116 is a mixture of epoxy resin and acid terminated polyester.

"Epox IF-2968-D" by the H.B. Fuller Company, 2900 Granada Lane, Oakdale, Minn. 55128, has been successfully used as a fiber-binder in the present invention.

Morton International, Post Office Box 15240, Reading, PAa. 19612, describes "Corvel 10-2050" as an epoxy based composition containing from 10 to 30% barium sulfate and from 10 to 30% titanium dioxide.

Morton describes "Corvel 40-7134" as a mixture of epoxy resin and polyester filled with 10 to 30% titanium dioxide.

Example 38

This example shows the superior tensile strength of batts of the present invention compared to prior batts bonded with a thermoplastic resin. This superior tensile strength is independent of oven temperature.

All cotton shoddy is fed to the garnet 11 of the apparatus 10. A fiber-binder of a thermoplastic copolymer of vinylidene chloride and vinyl chloride is added by the dispenser 12 at the level of 15 percent while maintaining the temperature of the oven 14 successively at the values shown in Column 1 of the following table. The resultant batts are cooled and their tensile strength measured in the transverse or cross machine direction, according to ASTM D-76. The results are recorded in Column 2 of the following table.

The above procedure is repeated except that the fiber-binder of thermoplastic copolymer is replaced with a fiber-binder of the present invention and the results recorded in Column 3 of the following table.

| 1. Oven temperature | 2. Comparative Batt Tensile Strength (psi) | 3. Inventive Batt Tensile Strength (psi) |
|---|---|---|
| 177° C. (350° F.) | 7.0 | 9.5 |
| 190° C. (375° F.) | 8.5 | 13.0 |
| 204° C. (400° F.) | 17.5 | 20.0 |
| 218° C. (425° F.) | 29.0 | 35.0 |

By reference to the above table it can be seen that the inventive batts have a tensile strength about one third greater irrespective of oven temperature. At 218° C. (425° F.) the tensile strength of the inventive batt is twenty percent greater. This means that the increased tensile strength of the inventive batt together with the greater firmness shown in Tables 3 and 4 will permit a batt of equivalent strength and firmness to be produced is from the inventive process by approximately ½ less resin, a tremendous improvement.

Example 39

This example illustrates the superior properties of the batts of the present invention for use as padding under automobile floor carpeting.

Batt 26 is exposed to a temperature of 232° C. (450° F.) for a period of one hour to simulate heating through the automobile floor by the catalytic converter. After the heating period, Batt 26 is examined. It produced no odor. It has neither discolored, nor lost its shape. Batt 26 passes the empirical automobile manufacturer's test and is suitable as a padding under automobile carpets.

Examples 40–57

The procedure of Example 20 is repeated except that Fiber-Binder-1 is replaced by an equal weight of the fiber-binder from the example listed in Column 2 of the following table thus producing a similar batt.

TABLE 7

| 1. This Example Number | 2. Example Number of Fiber-Binder | Designation of Batt |
|---|---|---|
| 40 | 2 | Batt 40 |
| 41 | 3 | Batt 41 |
| 42 | 4 | Batt 42 |
| 43 | 5 | Batt 43 |
| 44 | 6 | Batt 44 |
| 45 | 7 | Batt 45 |
| 46 | 8 | Batt 46 |

TABLE 7-continued

| 1. This Example Number | 2. Example Number of Fiber-Binder | Designation of Batt |
|---|---|---|
| 47 | 9 | Batt 47 |
| 48 | 10 | Batt 48 |
| 49 | 11 | Batt 49 |
| 50 | 12 | Batt 50 |
| 51 | 13 | Batt 51 |
| 52 | 14 | Batt 52 |
| 53 | 15 | Batt 53 |

TABLE 7-continued

| 1. This Example Number | 2. Example Number of Fiber-Binder | Designation of Batt |
|---|---|---|
| 54 | 16 | Batt 54 |
| 55 | 17 | Batt 55 |
| 56 | 18 | Batt 56 |
| 57 | 19 | Batt 57 |

Although the invention has been described in considerable detail with respect to certain preferred embodiments thereof, it will be understood that variations are within the skill of the art without departing from the spirit of the invention as described above and as defined in the appended claims.

I claim:

1. A dry process for producing a bonded, non-woven, batt of fibers comprising the steps of:
   I. providing a dry, solid, particulate, B-stage, fiber-binder comprising:
      A. a solid epoxy resin having:
         (a) an epoxide equivalent weight of above about 500;
         (b) a glass transition temperature above about 40° C.
         (c) a melting point above about 70° C.; and
      B. a coreactive effective amount of at least one cross-linking agent which reacts with the epoxide groups of the epoxy resin; and then
   II. contacting fiber-binding amounts of the fiber-binder with the fibers to form a raw batt with the fiber-binder loosely adhering to the fibers of the batt; and then
   III. heating the raw batt to a cross-linking temperature above the melting point of the fiber-binder but below the scorching or melting point of the fibers thereby melting the fiber-binder whereupon the fiber-binder flows to intersections of the fibers and subsequently the cross-linking agent reacts with the epoxide groups of the epoxy resin thereby converting the raw batt into a hot cross-linked batt; and then
   IV. cooling the hot cross-linked batt.

2. The process of claim 1, wherein the epoxide groups are those of Formula I:

3. The process of claim 1, wherein the epoxy resin has an epoxide equivalent weight between 500 and about 5,000.

4. The process of claim 1, wherein the epoxy resin is a resin of Formula II, where "n" is equal to 3 to 12

5. The process of claim 1, wherein the epoxy resin is a resin of Formula III, wherein "q" is equal to 3 to 12, and each "p" is independently selected from the group consisting of zero and one 6. The process of claim 1, wherein the epoxy resin is substantially linear.

7. The process of claim 1, wherein the epoxy resin is branched with a functionality of about 3 to about 6.

8. The process of claim 1, wherein the epoxy resin has a glass transition temperature above about 50° C.

9. The process of claim 1, wherein the epoxy resin has a melting point about 80° C.

10. The process of claim 1, wherein the cross-linking agent is a polycarboxylic acid.

11. The process of claim 1, wherein the cross-linking agent is a polycarboxylic acid anhydride.

12. The process of claim 1, wherein the cross-linking agent is polyfunctional amine.

13. The process of claim 1, wherein the cross-linking agent is dicyandiamide.

14. The process of claim 1, wherein the cross-linking agent is a resin of Formula IV wherein "r" is equal to 3 to 12, and each "s" is independently selected from the group consisting of zero and one (IV)

15. The process of claim 1, wherein the cross-linking agent is a resin of Formula V, wherein "t" is equal to 3 to 12

(V)

16. The process of claim 1, wherein the fiber-binder is free from solvents for the epoxy resin and for the cross-linking agent.

17. The process of claim 1, wherein the fiber-binder is anhydrous.

18. The process of claim 1, wherein the fiber-binder has a softening point of about 40 to about 160° C.

19. The process of claim 1, wherein the fiber-binder has a glass plate flow of about 14 to about 150 mm.

20. The process of claim 1, wherein the fiber-binder which is the epoxy resin and the cross-linking agent, is substantially coreacted only to the extent that fewer than twenty percent of the epoxide groups are reacted with the cross-linking agent.

21. The process of claim 1, wherein the fiber-binder has a particle size from about one to about 200 microns.

22. The process of claim 1, wherein the equivalent ratio, A:B, of (A) the epoxy resin to (B) the cross-linking agent, is from about 1.3:1 to about 1:1.3.

23. The process of claim 1, wherein the fiber-binder comprises from about 2 to about 40 weight percent based on the weight of the cross-linked batt.

24. The process of claim 1, wherein the heating of the raw batt is done at a temperature of from about 100 to about 240° C. for a sufficient time or from about 20 seconds to about 10 minutes at an adequate temperature, thereby converting the raw batt into a cross-linked batt.

25. The process of claim 1, wherein each particle of the fiber binder comprising:
  A. a solid epoxy resin having:
    (a) an epoxide equivalent weight of above about 500;
    (b) a glass transition temperature above about 40° C.;
    (c) a melting point above about 70° C.; and
  B. a coreactive effective amount of at least one cross-linking agent which reacts with epoxide groups of the epoxy resin.

26. The process of claim 1, wherein fiber-binding amounts of the dry fiber-binder are contacted with the fibers in a continuous moving web or batt.

27. A dry process for producing a bonded, non-woven, batt of fibers comprising the steps of:

I. providing a dry, solid, particulate, B-stage, fiber-binder comprising:
  A. a solid epoxy resin having:
    (a) an epoxide equivalent weight of above about 500;
    (b) a glass transition temperature above about 40° C.;
    (c) a melting point above about 70° C.; and
  B. a coreactive effective amount of at least one cross-linking agent which reacts with the epoxide groups of the epoxy resin; and then II. contacting fiber-binding amounts of the dry fiber-binder with the fibers to form a raw batt with the fiber-binder loosely adhering to the fibers of the batt; and then III. heating the raw batt briefly to a cross-linking temperature above the melting point of the fiber-binder but below the scorching or melting point of the fibers thereby melting the fiber-binder whereupon the fiber-binder flows to intersections of the fibers and a portion of the cross-linking agent reacts with a portion of the epoxide groups of the epoxy resin thereby converting the raw batt into a hot batt; and then IV. cooling the hot batt; and then V. placing the batt between open male and female molds, and then VI. closing the open male and female molds having the semi-cured batt therebetween, thereby causing the batt to take the form of the male mold and the female mold; and then VII. heating the male mold, the female mold, and the batt to a cross-linking temperature above the melting point of the fiber-binder but below the scorching or melting point of the fibers thereby melting the fiber-binder and reacting the cross-linking agent with the remaining epoxide groups of the epoxy resin thereby converting the B-stage resin to a C-stage resin and converting the batt into a shaped article composed of a fully cross-linked batt.

28. A dry process for producing a bonded, non-woven, batt of fibers comprising the steps of:

I. providing a dry, solid, particulate, B-stage, fiber-binder comprising:
  A. a solid epoxy resin having;
    (a) an epoxide equivalent weight of above about 500;
    (b) a glass transition temperature above about 40° C.;
    (c) a melting point above about 70° C.; and
  B. a coreactive effective amount of at least one cross-linking agent which reacts with epoxide groups of the epoxy resin; and
  C. about one to about 60% by weight of non-crosslinking fillers based on the weight of the fiber binder, and, then II. contacting fiber-binding amounts of the dry fiber-binder with the fibers to form a raw batt with the fiber-binder loosely adhering to the fibers of the batt; and then III. heating the raw batt to a cross-linking temperature above the melting point of the fiber-binder but below the scorching or melting point of the fibers thereby melting the fiber-binder whereupon the fiber-binder flows to intersections of the fibers and the cross-linking agent reacts with the epoxide groups of the epoxy resin thereby converting the raw batt into a hot cross-linked batt; and then IV. cooling the hot batt.

29. The process according to claim 27, in which the batt capable of being hot molded is without any phenol formaldehyde resin (resol).

30. A dry process for producing a bonded, non-woven, batt of fibers comprising the steps of:

I. providing a dry, solid, particulate, B-stage, fiber-binder comprising:
   A. a solid epoxy resin having:
      (a) an epoxide equivalent weight of above about 500;
      (b) a glass transition temperature above about 40° C.;
      (c) a melting point above about 70° C.; and
   B. a coreactive effective amount of at least one cross-linking agent which reacts with epoxide groups of the epoxy resin; and
   C. a particulate inorganic filler; and then II. contacting fiber-binding amounts of the dry fiber-binder with the fibers to form a raw batt with the fiber-binder loosely adhering to the fibers of the batt; and then

III. heating the raw batt to a cross-linking temperature above the melting point of the fiber-binder but below the scorching or melting point of the fibers thereby melting the fiber-binder whereupon the fiber-binder flows to surround each particle of filler and flows to intersections of the fibers and the cross-linking agent reacts with the epoxide groups of the epoxy resin thereby converting the raw batt into a hot cross-linked batt; and then IV. cooling the hot cross-linked batt.

31. The process of claim 30, wherein the filler is selected from the group consisting of barium sulfate and calcium carbonate.

32. A dry process for producing a bonded, non-woven, batt of fibers comprising the steps of:

I. providing a dry, solid, particulate, B-stage, fiber binder consisting essentially of equivalent amounts of:
   A. a solid epoxy resin of Formula II, (II)

wherein "n" is an integer from about 3 to about 7; and
   B. dicyandiamide; and then

II. contacting fiber-binding amounts of dry fiber-binder with the fibers to form a raw batt with the fiber-binder loosely adhering to the fibers of the batt; and then III. heating the raw batt to a temperature of about 100° C. to about 240° C. for one to five minutes whereupon the fiber-binder flows to intersections of the fibers and whereupon the dicyandiamide reacts with the epoxide groups of the epoxy resin thereby converting the raw batt into a hot cross-linked batt; and then IV. cooling the hot cross-linked batt.

33. A dry process for producing a bonded, non-woven, batt of fibers comprising the steps of:

I. providing a dry, solid, particulate, B-stage, fiber-binder comprising equivalent amounts of:
   A. a solid epoxy resin of Formula III, (III)

wherein "q" is equal to 3 to 12, and each "p" is independently selected from the group consisting of zero and one; and
   B. trimellitic anhydride; and then II. contacting fiber-binding amounts of the dry fiber-binder with the fibers to form a raw batt with the fiber-binder loosely adhering to the fibers of the batt; and then

III. heating the raw batt to a temperature of about 100° C. to about 240° C. for one to five minutes whereupon The fiber-binder flows to intersections of the fibers and whereupon the trimellitic anhydride reacts with the epoxide groups of the epoxy resin thereby converting the raw batt into a hot cross-linked batt; and then IV. cooling the hot cross-linked batt.

34. A dry process for producing a bonded, non-woven, batt of fibers comprising the steps of:

I. providing a dry, solid, particulate, partially cross-linked, fiber binder comprising:

A. a solid epoxy resin of Formula III, (III)

wherein "q" is equal to 3 to 7, and each "p" is independently selected from the group consisting of zero and one, said epoxy resin having epoxide groups of Formula I;

(I)

wherein the epoxy resin has an epoxide equivalent weight between about 600 and about 3,000; and wherein the epoxy resin is substantially linear with a functionality of about 2; and wherein the epoxy resin has a glass transition temperature above about 50° C.; and B. trimellitic anhydride as a cross-linking agent; and C. calcium carbonate present in an amount from about one to about 60% by weight of a particulate inorganic filler based on the weight of the fiber-binder;

wherein the fiber-binder is free from solvents for the epoxy resin and for the cross-linking agent; and wherein the fiber-binder is anhydrous; and wherein the fiber-binder has a softening point of about 80 to about 120° C.;

wherein the fiber-binder has a glass plate Low of about 35 to about 125 mm; and wherein the fiber-binder, the epoxy resin and the cross-linking agent are substantially coreacted only to the extent that fewer than twenty percent of the epoxide groups are reacted with the cross-linking agent;

wherein the fiber-binder is in the B-stage; and wherein the fiber-binder has a particle size from about 5 to 50 microns; and wherein the equivalent ration, A:B of (A) the epoxy resin to (B) the cross-linking agent, is from about 1.3:1 to about 1:1.3; and then II. contacting fiber-binding amounts of the dry fiber-binder with the fibers to form a raw batt with the fiber-binder loosely adhering to the fibers of the batt;

wherein the fiber-binder comprises from about 2 to about 40 weight percent based on the combined weight of the fibers and the fiber-binder; and then III. heating the raw batt to a temperature of about 100° C. to about 240° C. for one to five minutes whereupon the fiber-binder flows to intersections of the fibers and whereupon the trimellitic anhydride reacts with the epoxide groups of the epoxy resin thereby converting the raw batt into a hot cross-linked batt; and IV. cooling the hot cross-linked batt.

35. The process according to one of claims 1, 30, 32, 33 and 27 in which the fiber binder is scrap powder paint.

* * * * *